United States Patent
Ryu et al.

(10) Patent No.: US 7,781,515 B2
(45) Date of Patent: *Aug. 24, 2010

(54) FLAME RETARDANT POLYMER COMPOSITION

(75) Inventors: Young Sik Ryu, Anyang-si (KR); Sang Hyun Hong, Gunpo-Si (KR); Sung Hee Ahn, Seoul (KR); Jae Ho Yang, Gunpo-si (KR); Su Hak Bae, Seoul (KR); Soon Young Jin, Gunpo-si (KR)

(73) Assignee: Cheil Industries Inc., Gyungsangbuk-do (KR)

( * ) Notice: Subject to any disclaimer, the term of this patent is extended or adjusted under 35 U.S.C. 154(b) by 1122 days.

This patent is subject to a terminal disclaimer.

(21) Appl. No.: 11/348,507

(22) Filed: Feb. 6, 2006

(65) Prior Publication Data

US 2006/0183826 A1    Aug. 17, 2006

Related U.S. Application Data

(63) Continuation-in-part of application No. PCT/KR03/02688, filed on Dec. 9, 2003.

(30) Foreign Application Priority Data

Aug. 4, 2003   (KR) ..................... 10-2003-0053856

(51) Int. Cl.
   *C08K 5/51* (2006.01)
(52) U.S. Cl. .................. 524/710; 524/508; 524/583; 526/328; 526/329.3; 526/329.2; 526/335
(58) Field of Classification Search .................. 526/328, 526/329.3, 329.2, 335; 524/508, 583, 710
   See application file for complete search history.

(56) References Cited

U.S. PATENT DOCUMENTS

| 3,849,368 A | 11/1974 | Anderson et al. |
| 4,459,381 A | 7/1984 | Trivedi |
| 4,618,633 A * | 10/1986 | Taubitz et al. .................. 524/80 |
| 4,632,946 A | 12/1986 | Muench |
| 5,030,674 A | 7/1991 | Notorgiacomo |
| 5,859,147 A | 1/1999 | Dalla Torre et al. |
| 6,054,515 A | 4/2000 | Blount |
| 6,306,941 B1 | 10/2001 | Klatt et al. |
| 2006/0183825 A1 | 8/2006 | Hong et al. |
| 2006/0189729 A1 | 8/2006 | Bae et al. |
| 2006/0189730 A1 | 8/2006 | Hong et al. |

FOREIGN PATENT DOCUMENTS

| DE | 42 09 029 A1 | 9/1993 |
| DE | 19 637 368 | 3/1998 |
| EP | 0 075 863 * | 4/1983 |
| EP | 1 069 157 A1 | 7/2001 |
| EP | 1 262 519 | 12/2002 |
| GB | 2 003 888 | 3/1979 |
| JP | 61009450 | 1/1986 |
| JP | 10-195287 * | 7/1998 |
| JP | 11-140270 A | 5/1999 |
| JP | 2001-40172 A | 2/2001 |
| WO | WO 98/11160 A1 | 3/1998 |
| WO | WO 2004 029143 | 4/2004 |

OTHER PUBLICATIONS

Abstract of DE 4209029 published Sep. 23, 1993.
European Search Report completed Mar. 12, 2007 with Annex.
Co-pending U.S. Appl. No. 11/416,870, filed May 2, 2006, titled Flame Retardant Polymer Composition, and assigned to the assignee of this application.
Partial International Search Report dated May 17, 2004 for International Application No. PCT/KR2003/002688, filed Dec. 9, 2003.
European Search Report completed Aug. 7, 2006 (for commonly owned EP application) Abstract XP002393756 which relates to Abstract of JP 61009450 published Jan. 17, 1986 Abstract of JP 61009450 published Jan. 17, 1986.

* cited by examiner

*Primary Examiner*—Ling-Siu Choi
(74) *Attorney, Agent, or Firm*—Maria Parrish Tungol

(57) ABSTRACT

A polymer composition includes a rubber modified aromatic vinyl resin and a cyclic alkyl phosphate compound. In some embodiments, the cyclic alkyl phosphate compound is able to impart good flame retardancy to the composition, while maintaining a good balance of the other physical and mechanical properties of the resin including Vicat Softening Temperature and impact strength.

28 Claims, No Drawings

FLAME RETARDANT POLYMER COMPOSITION

CROSS-REFERENCE TO RELATED APPLICATIONS

This application is a continuation-in-part application under 35 U.S.C. §365 (c) claiming the benefit of the filing date of PCT Application No. PCT/KR2003/002688 designating the United States, filed Dec. 9, 2003. The PCT Application was published in English as WO 2005/012416 A1 on Feb. 10, 2005, and claims the benefit of the earlier filing date of Korean Patent Application No. 10-2003-0053856, filed Aug. 4, 2003. The contents of the PCT Application including its international publication and Korean Patent Application No. 10-2003-0053856 are incorporated herein by reference in their entirety.

BACKGROUND

1. Field

The invention relates to a flame retardant polymer composition comprising a rubber modified aromatic vinyl resin employing a cyclic alkyl phosphate compound.

2. Description of the Related Technology

A rubber modified styrenic resin is excellent in mold processability and mechanical properties, therefore, the resin has been widely applied to electric or electronic goods and office supplies. However, one disadvantage is that the styrenic resin is easily flammable. Therefore, methods for improving flame retardancy of rubber-modified styrenic resins have been developed.

A widely known method for imparting flame retardancy to polymer resins is the addition of a halogen-containing compound. Examples of halogen-containing compounds include polybromodiphenyl ether, tetrabromobisphenol-A, and epoxy compounds substituted by bromine. However, halogen-containing compounds may corrode the mold by releasing hydrogen halide gases during the molding process. They may also be fatally harmful due to the toxic gases liberated in the case of fire. For example, a polybromodiphenyl ether can produce toxic gases such as dioxin or difuran during combustion. Therefore, a goal in this field is to develop a flame retardant which is prepared without a halogen-containing compound.

SUMMARY OF THE EMBODIMENTS

According to some embodiments, a polymer composition comprises a rubber modified aromatic vinyl resin, and a cyclic alkyl phosphate compound represented by the formula (I):

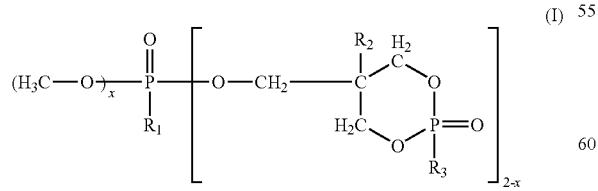

In the formula, $R_1$, $R_2$, and $R_3$ are independently $C_{1-4}$ alkyl, and x is an integer of 0 or 1.

In some embodiments, the composition comprises about 100 parts by weight rubber modified aromatic vinyl resin and about 0.1 to about 15 parts by weight of the cyclic alkyl phosphate compound. In some embodiments, the rubber modified aromatic vinyl resin comprises one or more selected from the group consisting of an acrylonitrile-butadiene-styrene (ABS) copolymer resin, an acrylonitrile-ethylenepropylene rubber-styrene (AES) copolymer resin, and an acrylonitrile-acryl rubber-styrene (AAS) copolymer resin.

In certain embodiments, the rubber modified aromatic vinyl resin comprises a rubber polymer and a copolymeric moiety, wherein the copolymeric moiety comprises a repeating unit of an aromatic vinyl monomer and a repeating unit of an unsaturated nitrile-containing monomer, wherein the rubber polymer is about 5 to about 35 parts by weight, and the copolymeric moiety is about 35 to about 95 parts by weight.

In embodiments, the rubber polymer comprises one or more selected from the group consisting of diene rubber, a saturated form of the diene rubber, isoprene rubber, acryl rubber, and terpolymer of ethylene-propylene-diene (EPDM).

The rubber polymer of some embodiments comprises one or more selected from the group consisting of polybutadiene, poly(styrene-butadiene), poly(acrylonitrile-butadiene), and polybutyl acrylic acid. In some embodiments, the rubber monomers units and/or polymer units can be copolymerized with aromatic vinyl monomer comprising one or more selected from the group consisting of styrene, α-methyl styrene, and p-methyl styrene. Additionally, the aromatic vinyl monomer can be copolymerized with an unsaturated nitrile-containing compound such as acrylonitrile or methacrylonitrile.

In embodiments, the rubber modified aromatic vinyl resin further comprises a repeating unit from one or more monomers selected from the group consisting of acrylic acid, methacrylic acid, maleic anhydride, and N-substituted maleimide.

In certain embodiments, the polymer composition further comprises an aromatic phosphate ester. In some of these embodiments, the aromatic phosphate ester is about 0.1 to about 20 parts by weight, based on the rubber aromatic vinyl resin totaling 100 parts by weight. Some embodiments of the aromatic phosphate ester are represented by the following Formula (II):

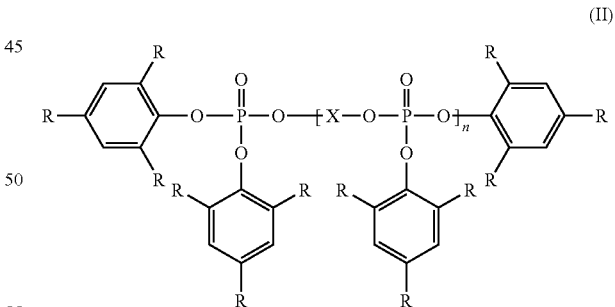

In the formula, R may be independently selected from hydrogen or $C_{1-4}$ alkyl. In embodiments, X is derived from a compound comprising two hydroxyaryl groups. Further, n may be an integer of 0, 1, 2, 3, or 4. When X is derived from a compound comprising two hydroxylaryl groups, the compound comprising two hydroxyaryl groups may be selected from the group consisting of resorcinol, hydroquinone, bisphenol-A. In other embodiments, X is selected from arylene or multiple aryl groups.

In some embodiments, the polymer composition comprises an aromatic phosphate ester selected from the group consisting of triphenyl phosphate, tri(2,6-dimethyl)phosphate, resorcinol bis(diphenyl)phosphate, resorcinol bis(2,6-dimethyl phenyl)phosphate, resorcinol bis(2,4-ditertiary butyl phenyl)phosphate, hydroquinone bis(2,6-dimethyl phenyl)phosphate, hydroquinone bis(2,4-ditertiary butyl phenyl) phosphate.

In some embodiments, the polymer composition comprises a cyclic alkyl phosphate compound such as methyl-bis (5-ethyl-2-methyl-1,3,2-dioxaphosphorinan-5-yl) methyl methyl phosphonic acid ester P-oxide or methyl-bis(5-ethyl-2-methyl-1,3,2-dioxaphosphorinan-5-yl) phosphonic acid ester P, P'-dioxide.

Embodiments of the composition also include where the composition is formed in a shaped article. Embodiments of the shaped article may have a flame retardancy of V-2, V-1, or V-0 when a specimen of the article is tested under the standard UL-94VB (⅛"). Further, some embodiments of the article have an impact strength of greater than or equal to about 22 kgf·cm/cm when a specimen of the article is tested under the standard ASTM D-256 A (⅛" notched) at 23° C. Additionally, the article may also have a Vicat Softening Temperature of greater than or equal to about 92° C. when a specimen of the article is tested under the standard ASTM D-1525 under a 5 kg load.

Other embodiments of the composition which is in the form of a shaped article may have a flame retardancy of V-2, V-1, or V-0 when a specimen of the article is tested under the standard UL-94(VB) (1/12"). Some of these embodiments additionally have an impact strength of greater than or equal to about 22 kgf·cm/cm when a specimen of the article is tested under the standard ASTM D-256 A (⅛" notched) at 23° C. Some embodiments may also have a Vicat Softening Temperature of greater than or equal to about 92° C. when a specimen of the article is tested under the standard ASTM D-1525 under a 5 kg load.

Another embodiments includes an electronic device, comprising an electrical circuit; and a housing enclosing at least part of the electrical circuit, the housing comprising a portion, which comprises the composition of certain embodiments. In these embodiments, the portion may have a flame retardancy of V-2, V-1, or V-0 when tested under the standard UL-94VB (⅛"). Additionally, the portion may have an impact strength of greater than or equal to about 22 kgf·cm/cm when a specimen of the article is tested under the standard ASTM D-256 A (⅛" notched) at 23° C. Other embodiments of the portion also have a Vicat Softening Temperature of greater than or equal to about 90° C. when tested under the standard ASTM D- 1525 under a 5 kg load.

Another embodiment is a method of making an electronic device, comprising providing an electrical circuit, providing a housing comprising a portion, and enclosing at least part of the electrical circuit with the housing, wherein the portion comprises the composition of some embodiments.

DETAILED DESCRIPTION OF EMBODIMENTS

As noted above, one aspect of this invention relates to a polymer composition. According to various embodiments, the polymer composition comprises a rubber-modified aromatic vinyl resin and cyclic alkyl phosphate compound. Molded articles comprising the polymer composition of the embodiments show enhanced physical or mechanical properties as compared to other compositions less one or more components. The molded articles of the embodiments also demonstrate improved flame retardancy over compositions less one or more components. As will be discussed, the molded articles according to embodiments of the invention have good flame retardancy, while maintaining excellent impact strength and thermal stability.

In one embodiment, the flame retardant polymer composition can comprise a rubber modified aromatic vinyl resin and a cyclic alkyl phosphate compound. One embodiment includes a cyclic alkyl phosphate compound having the following formula (I):

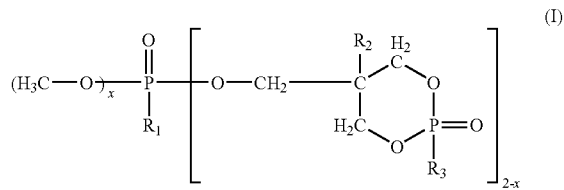

In the formula, $R_1$, $R_2$, and $R_3$ are independently selected from $C_{1-4}$ alkyl, and x is an integer from 0 to 1. In some embodiments, x is either 0 or 1.

Other embodiments can include less than 10 parts by weight of an aromatic phosphate ester compound. This compound can be represented by formula (II):

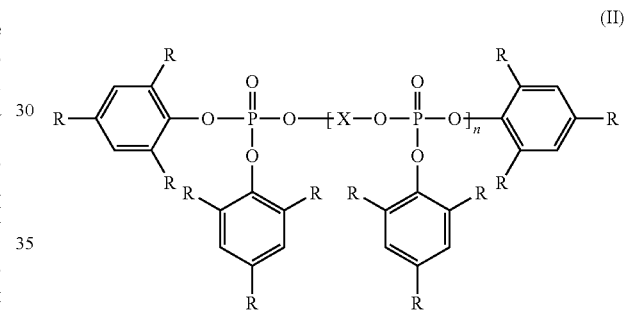

In some embodiments, each R is independently hydrogen or $C_{1-4}$ alkyl.

These components are further described herein.

Rubber-modified Aromatic Vinyl Resin

According to embodiments, the rubber modified aromatic vinyl resin (A) comprises ($a_1$) a copolymer of a rubber monomer and an aromatic vinyl copolymer. This is generally referred to herein as a graft copolymer resin. An example of such a copolymer is ABS which is a graft copolymer of butadiene rubber and a styrene-acrylonitrile (SAN) copolymer. The rubber monomers makes up the core of the polymer resin, while the additional aromatic vinyl copolymer is copolymerized with the rubber core to create an outer shell to the rubber core. The rubber modified aromatic vinyl resin according to some embodiments is a polymer wherein rubber phase polymers are dispersed in the form of particles in a matrix.

In some embodiments, the rubber-modified aromatic vinyl resin (A) (which is also technically a terpolymer), can additionally comprise an additional shell surrounding the rubber core, or a matrix which is dispersed with the rubber-aromatic vinyl copolymer resin. The additional shell or matrix can be comprised of ($a_2$) a copolymer of an aromatic vinyl monomer and another monomer, such as acrylonitrile or methacrylonitrile.

Further embodiments of the rubber modified aromatic vinyl resin (A), or its components ($a_1$ or $a_1$ and $a_2$) are described below:

The rubber modified aromatic vinyl resins can be obtained, for example, by polymerizing an aromatic vinyl monomer and a vinyl group-containing monomer that can be polymerized with the aromatic vinyl monomer, in the presence of a rubber phase polymer. In some embodiments, rubber-modified aromatic vinyl resins are prepared by known methods such as emulsion polymerization, suspension polymerization or bulk polymerization, and are conventionally produced by an extrusion with a styrene-containing graft copolymer resin and a styrene-containing copolymer resin. In the bulk polymerization, both a styrene-containing graft copolymer resin and a styrene-containing copolymer resin are prepared together in one process. In other polymerizations, a styrene-containing graft copolymer resin and a styrene-containing copolymer resin may be prepared separately. In either case, the contents of rubber in a final rubber-modified styrenic resin to the total weight of the base resin are preferably about 5 to about 30% by weight.

In some embodiments, graft copolymer ($a_1$) of the rubber modified aromatic vinyl resin can be prepared by graft polymerizing rubber polymer, aromatic vinyl monomer, and a copolymerizable monomer with said aromatic vinyl monomer. Additionally in some embodiments, another monomer can be added to provide processability and heat resistance.

Examples of the rubber polymer are diene-containing rubbers such as polybutadiene, poly(styrene-butadiene), poly(acrylonitrile-butadiene), etc; saturated forms of the diene containing rubbers; isoprene rubbers; acryl rubbers such as a polybutyl acrylic acid; and a terpolymer of ethylene-propylene-diene (EPDM). In some embodiments, a diene-containing rubber is used and more preferably a butadiene-containing rubber is used. In some embodiments, the content of rubber polymer in the graft copolymer resin is preferably in the range of about 5 to about 65 parts by weight (or 5 to about 65 % by weight) based on the total weight of graft copolymer resin ($a_1$). In other embodiments, the rubber polymer is about 10 to 50 parts by weight based on the total weight of the graft copolymer resin ($a_1$).

In some embodiments, the average size of rubber particles is preferably in the range of from 0.1 to 4 μm. Without wishing to be bound to any particular theory, we believe that this increases the impact strength of the rubber modified aromatic vinyl resin.

Examples of aromatic vinyl monomer are styrene, C-methyl styrene, p-methyl styrene, 1-methyl-4-(prop-1-en-2-yl)benzene, 1,3-dimethyl-5-(prop-1-en-2-yl)benzene, 1-vinyl naphthalene, 1-(prop-1-en-2-yl)naphthalene, and so forth. Styrene is the most preferable. The content of aromatic vinyl monomer in the graft copolymer resin is preferably in the range of about 35 to about 95 parts by weight based on the total weight of a graft copolymer resin. In other embodiments, the content of aromatic vinyl monomer is preferably in the range of about 45 to about 80 parts by weight based on the total weight of a graft copolymer resin.

"Aromatic vinyl" as used herein is a broad term that is to be interpreted according to its ordinary definition. This term would encompass styrenic resins. Some embodiments relate to rubber modified styrenic resins formed by the use of styrenic monomers. As such, all features described herein which apply to a rubber modified aromatic vinyl resin also apply to a rubber modified styrenic resin or a rubber modified styrene-containing resin. Other embodiments related to other aromatic vinyl resins such as a napthyl vinyl resin, or an anthracenyl vinyl resin.

At least one copolymerizable monomer may be introduced and applied to the aromatic vinyl monomers. It is preferred that the copolymerizable monomer is an unsaturated nitrile-containing compound such as acrylonitrile or methacrylonitrile. In some embodiments, the copolymerizable monomer can be used in an amount of about 1 to about 20 parts by weight. In other embodiments, the monomer is used in an amount from about 5 about to about 10 parts by weight.

In addition, some embodiments have other monomers added to the graft copolymerization in order for the resin to have good processability and heat resistance. These monomers include, but are not limited to, acrylic acid, methacryl acid, maleic anhydride and N-substituted maleimide, which can be added in the graft polymerization. The amounts of the monomers are in the range of about 0 to about 15 parts by weight based on the graft copolymer resin.

In some embodiments, a copolymer resin ($a_2$) can be used together with the graft copolymer. The copolymer resin can be prepared by copolymerizing aromatic vinyl monomers, monomers copolymerizable with the aromatic vinyl monomers (a second type of monomer), and monomer which provides processability and heat resistance (a third type of monomer) depending on the ratio and compatibility between monomers. The rubber may also be taken into consideration for the appropriate choice of the monomers.

Examples of the aromatic vinyl monomer are styrene, α-methylstyrene, p-methylstyrene, etc As discussed previously, aromatic vinyl monomers are not limited to styrenic monomers. In certain preferred embodiments, the aromatic vinyl monomer in the total copolymer resin is contained in the amount of 60 to 90 parts by weight.

At least one copolymerizable monomer may be introduced and applied to the aromatic vinyl monomers. Examples of the copolymerizable monomer are unsaturated nitrile-containing compounds such as acrylonitrile or methacrylonitrile. In some embodiments, about 10 to about 40 parts by weight of the copolymerizable monomer to the total copolymer is employed.

Furthermore, some embodiments may optionally include from about 0 to 30 parts by weight of other monomers such as acrylic acid, methacrylic acid, maleic anhydride and N-substituted maleimide. These monomers may be added and copolymerized thereto.

The examples of the rubber-modified aromatic vinyl resin (A) used in certain preferred embodiments are acrylonitrile-butadiene-styrene (ABS) copolymer resin, acrylonitrile-ethylenepropylene rubber-styrene (AES) copolymer resin, acrylonitrile-acryl rubber-styrene (AAS) copolymer resin, and so on.

In some embodiments, the rubber modified aromatic vinyl resin can be prepared by mixing about 10 to about 100% by weight of the graft copolymer resin ($a_1$) with about 0 to about 90% by weight of the copolymer resin ($a_2$). However, other embodiments may include about 10 to 50% by weight of the graft copolymer resin ($a_1$) and about 50 to about 90% by weight of the copolymer resin ($a_2$).

In some embodiments, the polymer composition comprises (A) 100 parts by weight of a rubber modified aromatic vinyl resin containing ($a_1$) 10 to 100% by weight of a graft copolymer resin prepared by graft-polymerizing 5 to 65 parts by weight of a rubber phase polymer, 35 to 95 parts by weight of an aromatic vinyl monomer, 1 to 20 parts by weight of a monomer-copolymerizable with said aromatic vinyl monomer and 0 to 15 parts by weight of a monomer for providing processability and heat resistance; and ($a_2$) 0 to 90% by weight of copolymer prepared by polymerizing 60 to 90 parts by weight of an aromatic vinyl monomer, 10 to 40 parts by weight of a monomer copolymerizable with said aromatic vinyl monomer and 0 to 30 parts by weight of a monomer for providing processability and heat resistance; and (B) 0.1 to 15 parts by weight of a cyclic alkyl phosphate compound.

Cyclic Alkyl Phosphate Compound

In certain embodiments, the rubber modified aromatic vinyl resin is used together with a cyclic alkyl phosphonate compound. In some of these embodiments, the cyclic alkyl phosphate compound is represented by the following chemical formula I:

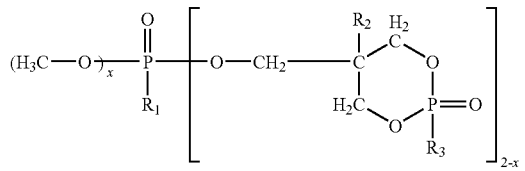

In the formula, $R_1$, $R_2$, and $R_3$ are independently selected from $C_{1-4}$ alkyl, and x is an integer from 0 to 1. $R_1$ can be any number of given variations of $C_{1-4}$ alkyl. For example, $R_1$ can be selected from methyl, ethyl, propyl, isopropyl, butyl, and sec-butyl. $R_1$, $R_2$, and $R_3$ may also be substituted or unsubstituted, which may result in some braching of the alkyl group.

In the formula, x is either 0 or 1.

Examples of the ring-shaped alkyl phosphonic acid compound having the above include methyl-bis(5-ethyl-2-methyl-1,3,2-dioxaphorinan-5-yl)methyl methyl phosphonic acid ester P-oxide, methyl-bis(5-ethyl-2-methyl-1,3,2-dioxaphorinan-5-yl)phosphonic acid ester P, P'-dioxide.

The cyclic alkyl phosphate compound (B) of certain embodiments can be used alone or in combination therewith, with the amount of about 0.1 to about 15 parts by weight, preferably 0.5 to 6 parts by weight, more preferably 0.5 to 2 parts by weight, based on the rubber modified aromatic vinyl resin totaling 100 parts by weight. Other embodiments of the polymer composition are described above. Without wishing to be bound to any particular theory, we believe that the amount of the cyclic alkyl phosphate compound may control the balance of flame retardancy and the polymer compositions other physical and mechanical properties. For example, if the cyclic alkyl phosphate compound is added less than 0.1 parts by weight, the resin composition has worse flame retardancy. Another example would be if the amount of the cyclic alkyl phosphate compound is more than 15 parts by weight resulting in a lower heat resistance of the resin composition.

In other embodiments, the polymer composition comprises (A) about 100 parts by weight of a rubber modified aromatic vinyl resin and about 0.1, 0.3, 0.5, 0.7, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 parts by weight of a cyclic alkyl phosphate. However some embodiments comprises about 15, 16, 17, 18, 19, 20, 21, 22, 23, 24, 25, 26, 27, 28, 29 30, 31, 32, 33, 34, or 35 parts by weight of the cyclic alkyl phosphate compound. In some of these embodiments, the cyclic alkyl phosphate compound is represented by formula (I).

Aromatic Phosphate Ester Compound

Some embodiments of the composition additionally comprise an aromatic phosphate ester compound. In some of these embodiments, this compound has the following structural formula:

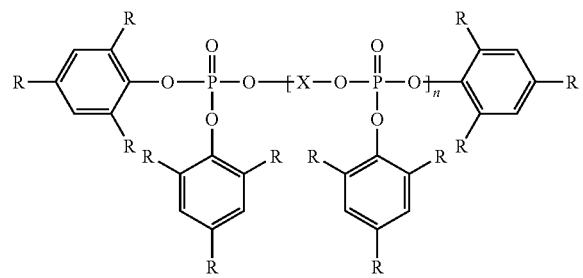

In some embodiments, each R is independently hydrogen or $C_{1-4}$ alkyl. For example, R can be selected from methyl, ethyl, propyl, isopropyl, butyl, sec-butyl. In other embodiments, the alkyl group may be substituted with a halogen, an alkene group, or an alkyne group. Each R may be selected independently from another R on the same or a different phenyl ring.

In certain embodiments, X is derived from a compound comprising two hydroxyaryl groups, and n is an integer 0, 1, 2, 3 or 4. For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth.

Where n is 0, the aromatic phosphate ester compound can be triphenyl phosphate, tri(2,6-dimethyl)phosphate, and the like. Where n is 1, the aromatic phosphate ester compounds include resorcinol bis(diphenyl)phosphate, resorcinol bis(2,6-dimethyl phenyl)phosphate, resorcinol bis(2,4-ditertiary butyl phenyl)phosphate, hydroquinol bis(2,6-dimethyl phenyl)phosphate, hydroquinol bis(2,4-ditertiary butyl phenyl) phosphate, and the like. The compounds can be used alone or in combination with one or more other aromatic phosphate ester compounds.

In certain embodiments, the aromatic phosphate ester can be used in the amount of less than 10 parts by weight, and more preferably from about 0 to about 6 parts by weight based on the rubber modified aromatic vinyl resin totaling 100 parts by weight. In some embodiments, the polymer composition comprises about, 0.03, 0.05, 0.08, 0.1, 0.5, 1, 1.5, 2, 2.5, 3, 3.5, 4, 4.5, 5, 5.5, 6, 6.5, 7, 7.5, 8, 8.5, 9, 9.5, and 10 parts by weight of an aromatic phosphate ester. In other embodiments, the polymer composition comprises about 11, 12, 13, 14, 15, 16, 17, 18, 19, 20, 21, 22, 23, 24, 25, 26, 27, 28, 29, 30, 31, 32, 33, 34, 35, 36, 37, 38, 39, and about 40 parts by weight of the aromatic phosphate ester.

However, some embodiments may use other phosphate esters and aromatic phosphate esters. The phosphate esters include trialkyl derivatives such as triethyl or trioctyl phosphate, and triaryl derivatives such as triphenyl phosphate and aryl-alkyl derivatives such as 2-ethylhexyl-diphenyl phosphate. A person having ordinary skill in the art will understand other suitable phosphate esters for this application.

The polymer compositions can contain one or more compounds or polymers in addition to the foregoing components. Additional components or additives may be added to provide additional properties or characteristics to the molding composition or to modify existing properties of the composition. For example, an inorganic filler such as glass fiber, carbon fiber, talc, silica, mica, and alumina may be added to improve mechanical strength and heat distortion temperature of the resin composition. In addition, the polymer composition may further include a heat stabilizer, an anti-oxidant, an ultraviolet absorbing agent, a light stabilizer, a flame retardant, a lubricant, a pigment and/or dye. In these embodiments, additives are employed in an amount of 0 to 30 parts by weight as per 100 parts by weight of rubber modified aromatic vinyl resin. One of ordinary skill in the art will appreciate that various additives may be added to the polymer compositions according to embodiments of the invention.

Preparation of Embodiments of Compositions

The polymer compositions can be prepared by mixing components including a rubber-modified aromatic vinyl resin and a cyclic alkyl phosphate compound. In some embodiments, one or more other additives may be mixed together with the components of the polymer composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. For example, the rubber modified aromatic vinyl resin may first be mixed with the cyclic alkyl phosphate compound, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a a predetermined shape and cured to form a molded article.

Enhanced Properties

An advantage of certain embodiments is to provide a flame retardant thermoplastic resin composition with good flame retardancy by using a cyclic phosphate ester compound as a flame retardant to a rubber modified aromatic vinyl resin. Another advantage of some embodiments is to provide a flame retardant thermoplastic resin composition with good properties, such as impact strength and heat resistance. In some embodiments, one advantage is to provide an environmentally friendly and non-toxic flame retardant thermoplastic resin composition which does not contain a halogen-containing compound.

Certain embodiments have an enhanced flame retardancy of at least V-2 when a specimen of the composition is tested under the standard UL-94VB with 1/8" or 1/12" samples. These samples may be of the composition or of formed articles comprising the compositions.

Some embodiments also have an enhanced impact strength of at least about 22 kg·cm/cm, more preferably at least about 24 kg·cm/cm, and even more preferably at least about 26 kg·cm/cm, when a specimen of the composition is tested according to the standard ASTM D256 A (1/8" notched) at 23° C.

Another preferred feature of a shaped article comprising the composition in accordance with some embodiments is that it has a Vicat Softening Temperature of at least about 92° C., more preferably at least about 93° C., and even more preferably at least about 94° C., when a specimen of the composition is tested according to the standard ASTM D1525 under a 5 kg load.

Shaped Articles of Electronic Devices

A shaped article can be made using the polymer composition according to the foregoing embodiments. In some embodiments, this article is molded into various shapes. For polymer with the composition, an extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical devices, in which a molded article made of the blend of the composition according to embodiments of the invention are used, include printers, computers, word processors, keyboards, personal digital assistants (PDA), telephones, mobile phones, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composition comprising a rubber-modified aromatic vinyl resin and a cyclic alkyl phosphate compound as described below. Some embodiments provide a method of making an electronic device, comprising providing an electrical circuit; providing a housing comprising a portion; and enclosing at least part of the electrical circuit with the housing, wherein the portion comprises the composition which comprises a rubber modified aromatic vinyl resin and a cyclic alkyl phosphate compound as described below.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the Components of the Polymer Compositions of Examples 1-3 and Comparative Examples 1-2:

(A) Rubber Modified Aromatic Vinyl Resin ($a_1$) Graft Copolymer Resin 50 parts of butadiene rubber latex, 36 parts of styrene, 14 parts of acrylonitrile, and 150 parts of deionized water were mixed. To the mixture, 1.0 part of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain g-ABS latex. To the g-ABS latex, 0.4 parts of sulfuric acid was added, coagulated and dried to obtain rubber modified polystyrene resin (g-ABS) in a powder form.

($a_2$) Copolymer Resin 75 parts of styrene, 25 parts of acrylonitrile, and 120 parts of deionized water were mixed. To the mixture, 0.2 parts of azobisisobutylonitrile (AIBN) 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried. Styrene-acrylonitrile copolymer (SAN) was obtained.

(B) Cyclic Alkyl Phosphate Compound

Antiblaze 1045 of Rhodia Co. [a mixture of 8% by weight of methyl-bis(5-ethyl-2-methyl-1,3,2-dioxaphosphorinan-5-yl)methyl methyl phosphonic acid ester P-oxide and 85% by weight of methyl-bis(5-ethyl-2-methyl-1,3,2-dioxaphosphorinan-5-yl)phosphonic acid ester P, P'-dioxide] was used.

(C) Aromatic Phosphoric Acid Ester Compound

Resorcinol bis(2,6-dimethylphenyl)phosphate by Daihachi Chemical of Japan (product name: PX200) was used.

Examples 1-3

The components as shown in Table 1 were mixed and the mixture was extruded at 180-250° C. with a conventional twin screw extruder in pellets. The resin pellets were dried at 80° C. for 3 hours, and molded into test specimens using a 6 oz injection molding machine at 180-280° C. and barrel temperature of 40-80° C.

The flame retardancy of the test specimens was measured in accordance with UL94VB with a thickness of ⅛" and 1/12" respectively. The impact strength was measured according to Izod impact strength ASTM D-256 A (⅛" notch) at 23° C. The Vicat Softening Temperature was measured according to ASTM D-1525 under 5 kg.

Comparative Examples 1-2

Comparative Example 1 was conducted in the same manner as in Example 1 except that the cyclic alkyl phosphate compound was not used. Comparative Example 2 was conducted in the same manner as in Example 1 except that the aromatic phosphate ester compound was used as a flame retardant instead of the cyclic alkyl phosphate compound. The test results are presented in Table 1.

TABLE 1

|  |  | Examples | | | Comparative Examples | |
|---|---|---|---|---|---|---|
|  |  | 1 | 2 | 3 | 1 | 2 |
| (A) Rubber Modified | ($a_1$) | 32 | 32 | 32 | 32 | 32 |
| Aromatic Vinyl Resin | ($a_2$) | 68 | 68 | 68 | 68 | 68 |
| (B) Cyclic Alkyl Phosphate Compound | | 1 | 3 | 2 | — | — |
| (C) Aromatic Phosphate Ester Compound | | — | — | 2 | — | 6 |
| UL94 flame retardancy (1/12") | | V-2 | V-2 | V-2 | Fail | V-2 |
| UL94 flame retardancy (⅛") | | V-2 | V-2 | V-2 | Fail | V-2 |
| Izod impact strength (kgf · cm/cm) | | 26 | 24 | 22 | 34 | 20 |
| Vicat Softening Temperature (° C.) | | 94 | 92 | 92 | 94 | 88 |

As shown above, the resin compositions employing a cyclic alkyl phosphate compound as a flame retardant demonstrated good flame retardancy without deterioration of impact strength and heat resistance compared to Comparative Examples 1-2. Thus, in some embodiments, a molded article comprising the composition can provide good physical properties when used in the production of electronic products including ultra-large-size thin films. Some embodiments have advantages in that they show excellent flame retardancy while having a good balance of properties, such as excellent impact resistance, Vicat Softening Temperature, and appearance.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A composition comprising:
a rubber modified aromatic vinyl resin;
a cyclic alkyl phosphate ester compound represented by the formula (I):

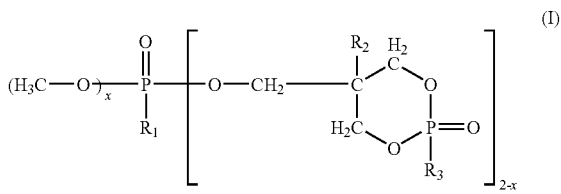

wherein $R_1$, $R_2$, and $R_3$ are independently $C_{1-4}$ alkyl, and
wherein x is an integer of 0 or 1 and
wherein the rubber modified aromatic vinyl resin comprises a rubber polymer and a copolymeric moiety, wherein the copolymeric moiety comprises a repeating unit of an aromatic vinyl monomer and a repeating unit of an unsaturated nitrile-containing monomer.

2. The composition of claim 1, wherein in the composition, the rubber modified aromatic vinyl resin is about 100 parts by weight, and wherein the cyclic alkyl phosphate compound is about 0.1 to about 15 parts by weight.

3. The composition of claim 1, wherein the rubber modified aromatic vinyl resin comprises one or more selected from the group consisting of an acrylonitrile-butadienestyrene (ABS) copolymer resin, an acrylonitrile-ethylenepropylene rubber-styrene (AES) copolymer resin, and an acrylonitrile-acrylic rubber-styrene (AAS) copolymer resin.

4. The composition of claim 1, wherein the rubber modified aromatic vinyl resin comprises a rubber polymer and a copolymeric moiety, wherein the copolymeric moiety comprises a repeating unit of an aromatic vinyl monomer and a repeating unit of an unsaturated nitrile-containing monomer, wherein the rubber polymer is about 5 to about 35 parts by weight, and the copolymeric moiety is about 35 to about 95 parts by weight.

5. The composition of claim 1, wherein the rubber polymer comprises one or more selected from the group consisting of diene rubber, a saturated form of the diene rubber, isoprene rubber, acryl rubber, and terpolymer of ethylene-propylenediene (EPDM).

6. The composition of claim 1, wherein the rubber polymer comprises one or more selected from the group consisting of polybutadiene, poly(styrene-butadiene), polyacrylonitrile-butadiene), and polybutyl acrylic acid.

7. The composition of claim 1, wherein the aromatic vinyl monomer comprises one or more selected from the group consisting of styrene, a-methyl styrene, and p-methyl styrene.

8. The composition of claim 1, wherein the unsaturated nitrile-containing compound is acrylonitrile or methacrylonitrile.

9. The composition of claim 1, wherein the rubber modified aromatic vinyl resin further comprises a repeating unit from one or more monomers selected from the group consisting of acrylic acid, methacrylic acid, maleic anhydride, and N-substituted maleimide.

10. The composition of claim 1, further comprising an aromatic phosphate ester.

11. The composition of claim 10, wherein the aromatic phosphate ester is about 0.1 to about 20 parts by weight, based on the rubber aromatic vinyl resin totaling 100 parts by weight.

12. The composition of claim 10, wherein the aromatic phosphate ester is represented by the following Formula (II):

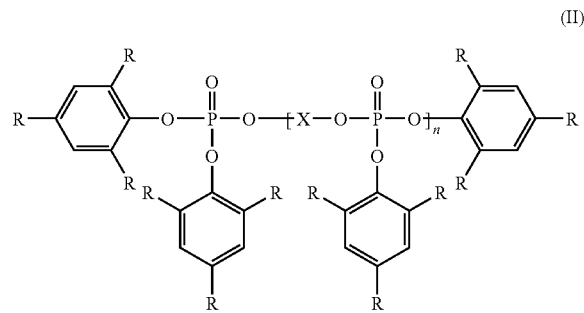

(II)

wherein R is independently hydrogen or $C_{1-4}$ alkyl;
wherein X is derived from a compound comprising two hydroxyaryl groups; and
wherein n is an integer of 0, 1, 2, 3, or 4.

13. The composition of claim 12, wherein the compound comprising two hydroxyaryl groups is selected from the group consisting of resorcinol, hydroquinone, bisphenol-A.

14. The composition of claim 12, wherein X is selected from-arylene or multiple aryl groups.

15. The composition of claim 10, wherein the aromatic phosphate ester is selected from the group consisting of triphenyl phosphate, tri(2,6-dimethyl)phosphate, resorcinol bis(diphenyl)phosphate, resorcinol bis(2,6-dimethyl phenyl) phosphate, resorcinol bis(2,4-ditertiary butyl phenyl) phosphate, hydroquinone bis(2,6-dimethyl phenyl) phosphate, hydroquinone bis(2,4-ditertiary butyl phenyl) phosphate.

16. The composition of claim 1, wherein the cyclic alkyl phosphate ester compound is methyl-bis(5-ethyl-2-methyl-1,3,2-dioxaphosphorinan-5-yl)methyl methyl phosphonic acid ester P-oxide or methyl-bis(5-ethyl-2-methyl-1,3,2dioxaphosphorinan-5-yl)phosphonic acid ester P,P'-dioxide.

17. The composition of claim 1, wherein the composition is formed in a shaped article.

18. The composition of claim 17, wherein the article has a flame retardancy of V-2, V-1, or V-0 when a specimen of the article is tested under the standard UL-94VB (1/8").

19. The composition of claim 18, wherein the article has an impact strength of greater than or equal to about 22 kgf·cm/cm when a specimen of the article is tested under the standard ASTM D-256 A (1/8" notched) at 23° C.

20. The composition of claim 18, wherein the article has a Vicat Softening Temperature of greater than or equal to about 92° C. when a specimen of the article is tested under the standard ASTM D-1525 under a 5 kg load.

21. The composition of claim 17, wherein the article has a flame retardancy of V-2, V-1, or V-0 when a specimen of the article is tested under the standard UL-94(VB) (1/12").

22. The composition of claim 21, wherein the article has an impact strength of greater than or equal to about 22 kgf·cm/cm when a specimen of the article is tested under the standard ASTM D-256 A (1/8" notched) at 23° C.

23. The composition of claim 21, wherein the article has a Vicat Softening Temperature of greater than or equal to about 92° C. when a specimen of the article is tested under the standard ASTM D-1525 under a 5 kg load.

24. The composition of claim 1, wherein the composition is formed into a film.

25. The composition of claim 1 wherein the composition contains about 0 parts of aromatic phosphate ester.

26. The composition of claim 1 wherein the resin in the composition consists of one or more rubber modified aromatic vinyl resin selected from the group consisting of an acrylonitrile-butadienestyrene (ABS) copolymer resin, an acrylonitrile-ethylenepropylene rubber-styrene (AES) copolymer resin, and an acrylonitrile-acryl rubber-styrene (AAS) copolymer resin.

27. A composition comprising a resin component and a phosphate ester flame retardant wherein the resin component consists of a rubber modified aromatic vinyl resin and the phosphate ester flame retardant comprises of a cyclic alkyl phosphate ester compound represented by the formula (I):

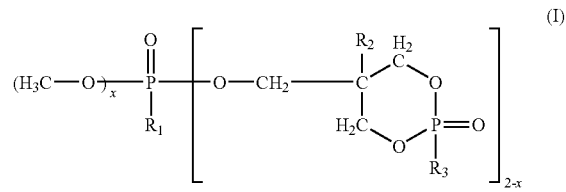

(I)

wherein $R_1$, $R_2$, and $R_3$ are independently $C_{1-4}$ alkyl, and wherein x is an integer of 0 or 1.

28. The composition of claim 27 wherein the phosphate ester flame retardant consists of the compound of formula (I).

* * * * *